United States Patent

Yanagida

[11] Patent Number: 6,087,949
[45] Date of Patent: Jul. 11, 2000

[54] METHOD AND APPARATUS FOR PREVENTING OVERHEAT OF PORTABLE TELEPHONE

[75] Inventor: Keiichirou Yanagida, Shizuoka, Japan

[73] Assignee: NEC Corporation, Tokyo, Japan

[21] Appl. No.: 09/280,079

[22] Filed: Mar. 29, 1999

[30] Foreign Application Priority Data

Apr. 6, 1998 [JP] Japan .................................. 10-093483

[51] Int. Cl.⁷ .................................................. G08B 21/00
[52] U.S. Cl. .......................... 340/635; 340/586; 379/428; 455/572
[58] Field of Search ..................................... 340/635, 584, 340/588, 586, 640, 646, 643, 655; 379/428, 433; 455/572, 573

[56] References Cited

U.S. PATENT DOCUMENTS

| | | | |
|---|---|---|---|
| 4,850,006 | 7/1989 | Sasaki et al. | 379/58 |
| 5,230,016 | 7/1993 | Yasuda | 379/58 |
| 5,771,471 | 6/1998 | Alberth, Jr. et al. | 455/573 |
| 5,920,264 | 7/1999 | Kim et al. | 340/584 |

FOREIGN PATENT DOCUMENTS

| | | |
|---|---|---|
| 1-142231 | 9/1989 | Japan . |
| 4-326211 | 11/1992 | Japan . |
| 7-177055 | 7/1995 | Japan . |
| 9-5411 | 1/1997 | Japan . |
| 9-214363 | 8/1997 | Japan . |
| 10-190487 | 7/1998 | Japan . |

*Primary Examiner*—Jeffery A. Hofsass
*Assistant Examiner*—Anh La
*Attorney, Agent, or Firm*—Young & Thompson

[57] ABSTRACT

A method and apparatus for preventing an accident or a fault of a device due to heat generation by calculating a temperature of a device expected after data transmission is finished to predict a temperature of the device is provided. In this method and apparatus, first, transmission data is applied, data transmission time and the expected device temperature when transmission is finished are calculated. And data transmission is started when the calculated temperature is lower than a set value and an alarm is generated for a user and transmission remains on standby when the calculated temperature is higher than the set value. Whether or not the data transmission is performed is selected with a user interface such as a display section and dial keys. When performing the data transmission is selected, a data transmission speed is decreased and the step of calculating the transmission time and the expected device temperature is repeated. During the data transmission, temperature monitoring is performed such that the device temperature is measured to continue the transmission when the temperature is lower than the set temperature and stop the transmission when the temperature goes higher than the set temperature.

7 Claims, 6 Drawing Sheets

|    | Data amount (byte) | Temperature rise (C°) |
|----|-------------------:|----------------------:|
| 1  |  5000              |  1  |
| 2  | 10000              |  3  |
| 3  | 15000              |  8  |
| 4  | 20000              | 14  |
| 5  | 25000              | 20  |
| 6  | 30000              | 28  |
| 7  | 35000              | 37  |
| 8  | 40000              | 45  |
| 9  | 45000              | 49  |
| 10 | 50000              | 50  |
| 11 | 55000              | 51  |
| 12 | 60000              | 52  |
| 13 | 65000              | 52  |
| 14 | 70000              | 52  |
| 15 | 75000              | 52  |
| 16 | 80000              | 52  |

METHOD AND APPARATUS FOR PREVENTING OVERHEAT OF PORTABLE TELEPHONE

BACKGROUND OF THE INVENTION

1. Field of the Invention

The present invention relates to overheat prevention for a portable telephone, more particularly, to a method and apparatus for calculating data transmission time to calculate a temperature of a device expected after data transmission based on the calculated data transmission time, thereby making it possible to previously determinate whether the temperature of the device exceeds a set temperature before starting transmission.

2. Description of the Related Art

FIG. 1A and FIG. 1B show an example of a prior art method of providing thermal protection for a communication device. This method is disclosed in Japanese Patent Publication No. 38594/95.

FIG. 1A is a block diagram showing a primary portion comprising communication device 1; microcomputer 2 for controlling communication device 1; and temperature sensor 3 for detecting a temperature of radiator 4 attached to a power amplifier of communication device 1. As shown in FIG. 1B, conventionally, when a temperature of the device exceeds temperature reference value $T_U$, transmission is limited and even emergency transmission can not be performed. This example, however, newly provides reference value $T_H$ to allow transmission only for a very short time even when the temperature exceeds $T_U$. In this point, this example differs from the present invention in its object and thus provides a different content from the present invention.

Besides the above-mentioned example, the following known examples of the prior art relating to this field are disclosed.

Japanese Patent Laid-open Publication No. 177055/95
Japanese Patent Laid-open Publication No. 5411/97
Japanese Patent Laid-open Publication No. 214363/97

When a portable telephone is used to transmit data, a TDMA (Time Division Multiple Access) system is conventionally utilized as a data transmission scheme to use only one of three slots in one frame as a transmission slot, thereby presenting a limit of a maximum transmission speed of 9.6 kbps.

In this case, since two of the three slots in one frame are not used for transmission, a temperature rise of the power amplifier is slow to thereby enable the temperature rise of the device to be sufficiently prevented with a countermeasure such as heat radiation from the power amplifier to a panel. However, associated with data transmission at a higher speed, the transmission speed is increased at as high as 28.8 kbps using a packet communication. This is achieved by a scheme in which three slots in one frame are used as transmission slots, which means that the power amplifier always operates.

Thus, the temperature rise is increased and can not be dealt with by the conventional heat radiation method. Conventionally, this temperature rise has been dealt with by a method of adding a plate for heat radiation to the device to release heat to the outside, or of improving heat resistance of electronic components. However, it is desired to avoid releasing heat by adding the plate for heat radiation as much as possible due to the need for a reduction in cost and weight of the device. On the other hand, the improvement in heat resistance of electronic components has a disadvantage of requiring time and cost to make it impossible to provide immediate countermeasures.

SUMMARY OF THE INVENTION

It is an object of the present invention to provide a method and apparatus for preventing overheat of a portable telephone. And it calculates an expected temperature of a device based on a transmitted data amount, generates an alarm when the resultant device temperature exceeds a certain degree of temperature to notify a user before starting transmission of a maximum temperature from heat generation caused by data transmission, and averts an accident or a fault of a device due to overheat.

Specifically, according to the present invention, a user can know, before data transmission is started, the device temperature expected when data transmission is finished. Data transmission is performed when the device temperature is expected not to exceed a set device temperature. The transmission is automatically stopped or disconnected when the device temperature goes higher than the set temperature during the transmission.

In other words, it is an object of the present invention to prevent an accident and a fault of the device due to heat generation by making data transmission on standby when the expected device temperature resulting from the calculation exceeds a certain temperature, warning a user of the expected device temperature, and then proceeding to a next step.

Additionally, it is also an object of the present invention to ensure a reduction in size, weight and cost of the device, which are characteristics the portable telephone should have essentially, by taking the above-mentioned countermeasure to prevent overheat and eliminating the need for adding the plate for heat radiation.

To achieve the above-mentioned objects, the overheat preventing apparatus for a portable telephone according to the present invention is for preventing overheat of the device during data transmission and has transmission data input means for receiving transmission data; information processing means for performing processing of calculation and comparison based on an amount of the received data and information on a temperature; temperature detection means for detecting a temperature of a device; and alarm means for generating an alarm when an expected device temperature is higher than a set temperature.

Also, the information processing means receives the transmission data amount, calculates transmission time based on the data amount, and calculates the expected temperature when transmission is finished.

The information processing means compares the calculation result of the expected device temperature when transmission is finished and the set temperature of the device.

An overheat preventing method for a portable telephone according to the present invention has a temperature calculating step (403) of receiving a transmission data amount, measuring a temperature of a device at this moment, and then calculating data transmission time and an expected device temperature when transmission is finished after a lapse of the data transmission time; a transmission starting step (405) of starting data transmission if the expected device temperature resulting from the calculation is lower than a set temperature; a temperature monitoring step (407) of measuring the temperature of the device during the data transmission and continuing the transmission when the temperature is lower than the set temperature and stopping the transmission if the temperature goes higher than the set temperature; an alarm and standby step (411) of generating an alarm and making the transmission on standby when the expected device temperature resulting from the calculation is higher than the set temperature; and a recalculating step of selecting whether or not the data transmission is performed (412) and decreasing a data transmission speed (413) and returning to the calculating step when it is selected that the data transmission is performed.

Also, in one aspect of the present invention, the set temperature is a sufficiently low temperature not to damage the device.

Furthermore, in one aspect, the recalculating step recalculates the expected device temperature to see whether the temperature is higher than the set temperature when a user selects transmission at a decreased speed, and proceeds to the starting step 405 if the calculated temperature is not higher than the set temperature.

The above and other objects, features and advantages of the present invention will become apparent from the following description with reference to the accompanying drawings which illustrate examples of the present invention.

DESCRIPTION OF THE PREFERRED EMBODIMENT

Figure 1A:
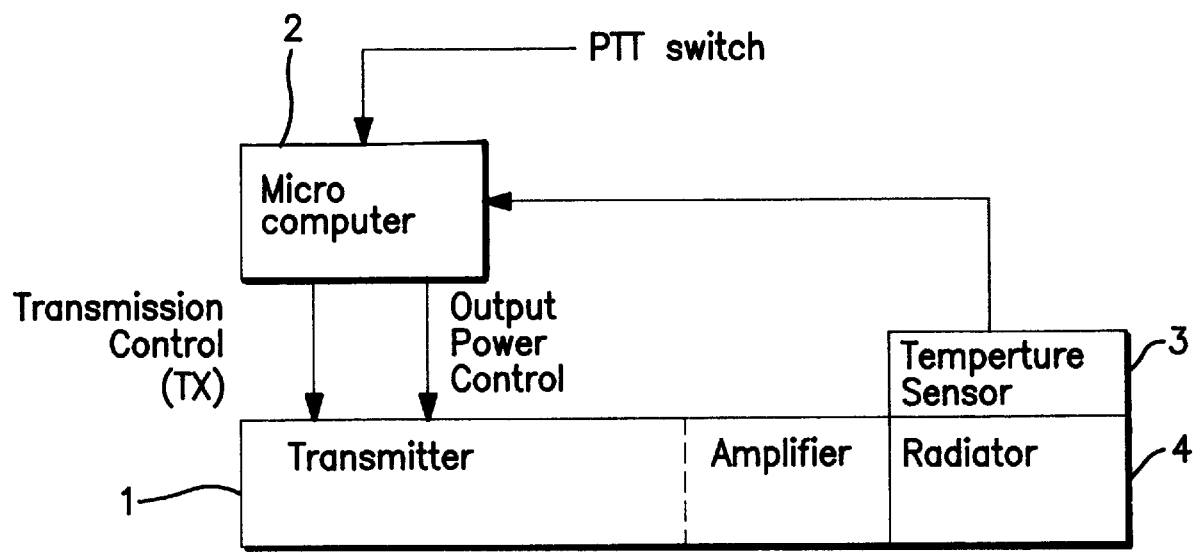
FIG. 1A is an explanatory view of a device configuration of a prior art.
Figure 1B:
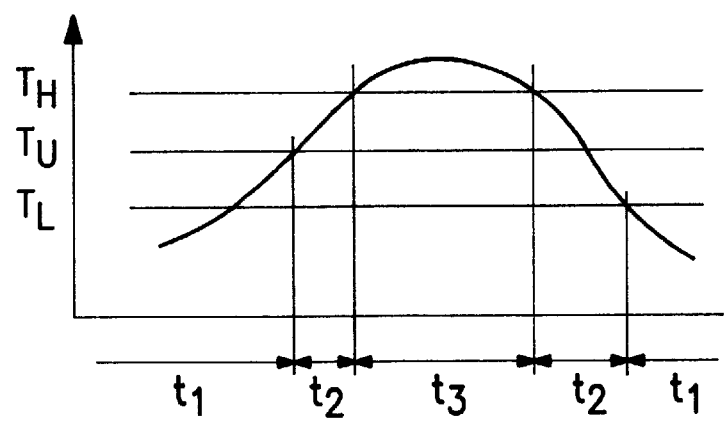
FIG. 1B is a diagram showing a relationship of a communication inhibit period and a temperature in the prior art.
Figure 2:
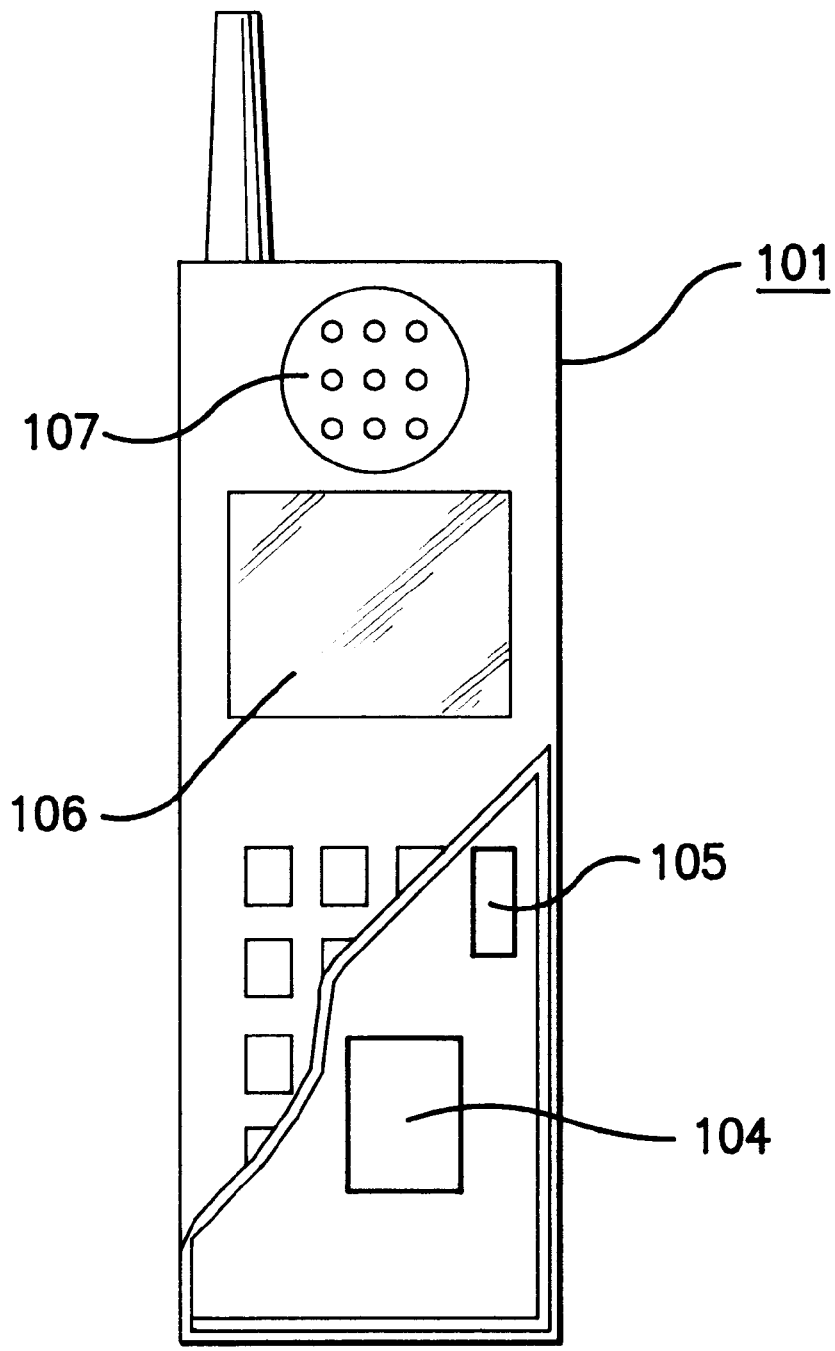
FIG. 2 is a front view of a telephone including a portion shown in a sectional view to which an overheat preventing method of the present invention is applied.

Next, an embodiment of the present invention will be described with reference to the drawings. FIG. 2 is a front view of a telephone including a portion shown in a sectional view to which one embodiment of an overheat preventing method for a portable telephone of the present invention is applied.

FIG. 2 shows portable telephone body 101, information processing section 104, temperature sensor 105, liquid crystal display section 106, and speaker 107.

Figure 3:
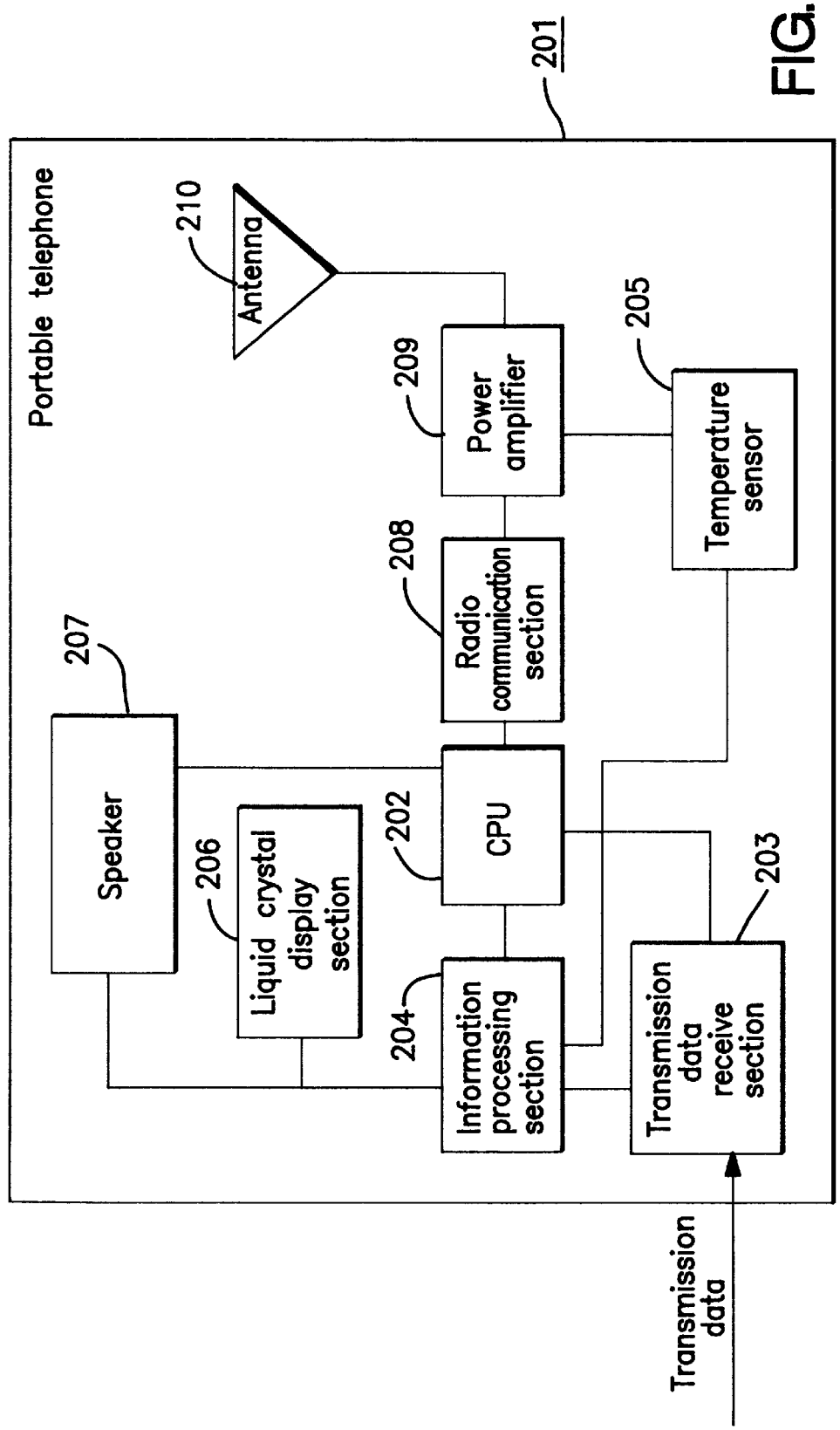
FIG. 3 is a block diagram showing a configuration of an overheat preventing apparatus for a portable telephone of the present invention.

FIG. 3 is a block diagram showing a configuration of the above-mentioned telephone.

Information processing section 204 has a function of calculating transmission time based on a transmission data amount applied to transmission data receive section 203 and a function of comparing a set temperature for a device and a temperature of the device expected after data transmission. In this embodiment, the set device temperature to be compared is set a sufficiently low temperature not to damage the device.

Information processing section 204 calculates the transmission time based on the data amount to be transmitted and calculates the expected device temperature when transmission is finished. When the calculation result value does not exceed the set device temperature, data transmission is started. When the calculation result value exceeds the set device temperature, an alarm sound is generated from speaker 207 in FIG. 3 or an alarm mark is displayed in liquid crystal display 206. Alternatively, both alarm sound and alarm display (for example "ALARM") may be simultaneously provided. Thereafter, when a user determines to select a data transmission speed and perform transmission, calculation is similarly performed again to see whether the expected device temperature exceeds the set device temperature and it is checked whether the data transmission can be performed at a safe device temperature.

Figure 4:
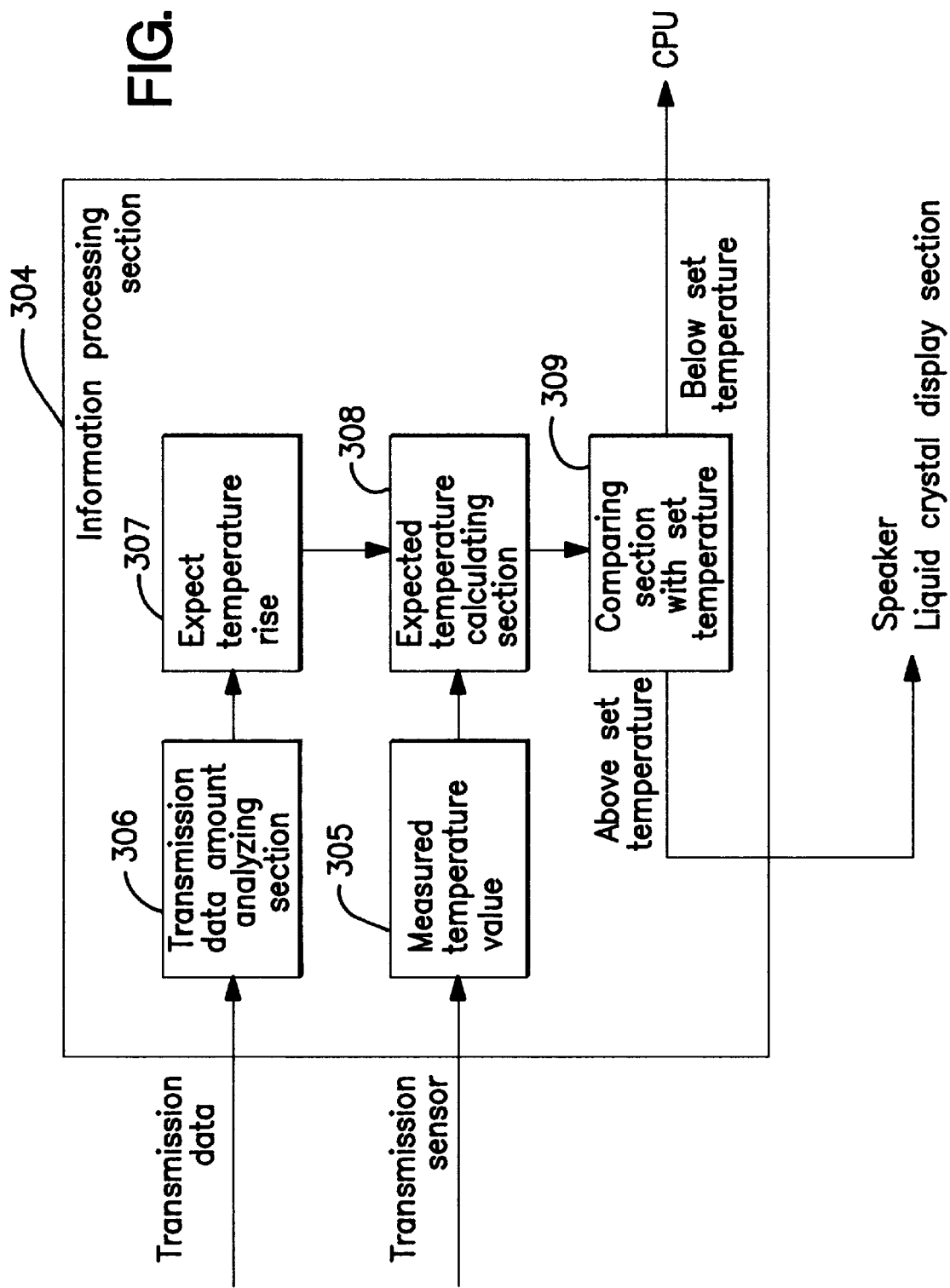
FIG. 4 is a block diagram showing a configuration of information processing section 204 in FIG. 3.

FIG. 4 shows a block diagram of a configuration of the information processing section in detail. Information processing section 304 is applied with the transmission data amount and a temperature of the device and calculates the expected device temperature after transmission is finished based on these information (308). Information processing section 304 then compares the calculated expected device temperature and the set device temperature (309). Data transmission is started when the expected device temperature is lower than the set device temperature, while the alarm is generated from the speaker and/or liquid crystal display section when the expected device temperature is higher than the set device temperature.

Figure 6:
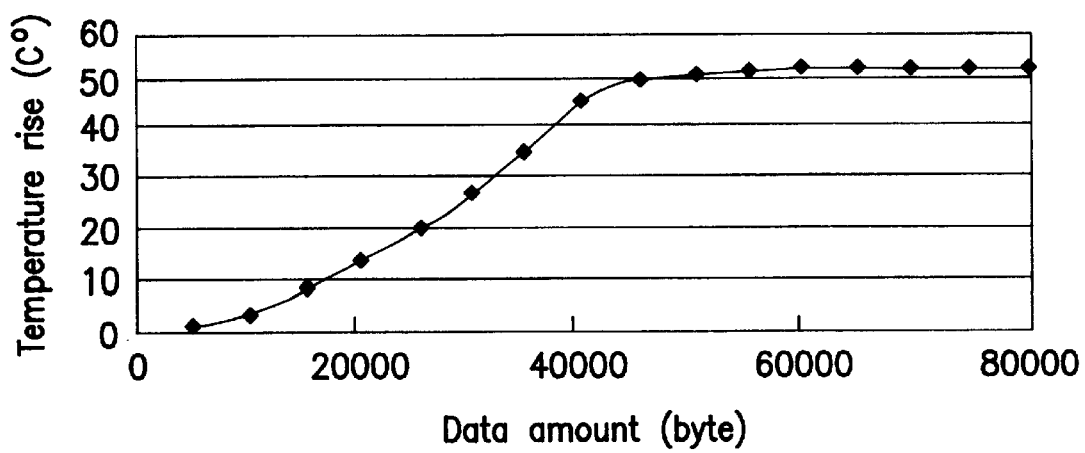
FIG. 6 is a curve of data amount-temperature rise showing an example of a relationship of a transmission data amount and a temperature rise of a device.

FIG. 6 is a diagram showing an example of a relationship of the transmission data amount and a temperature rise. The set device temperature is calculated and set based on a temperature rise and an ambient temperature of the device.

Figure 5:
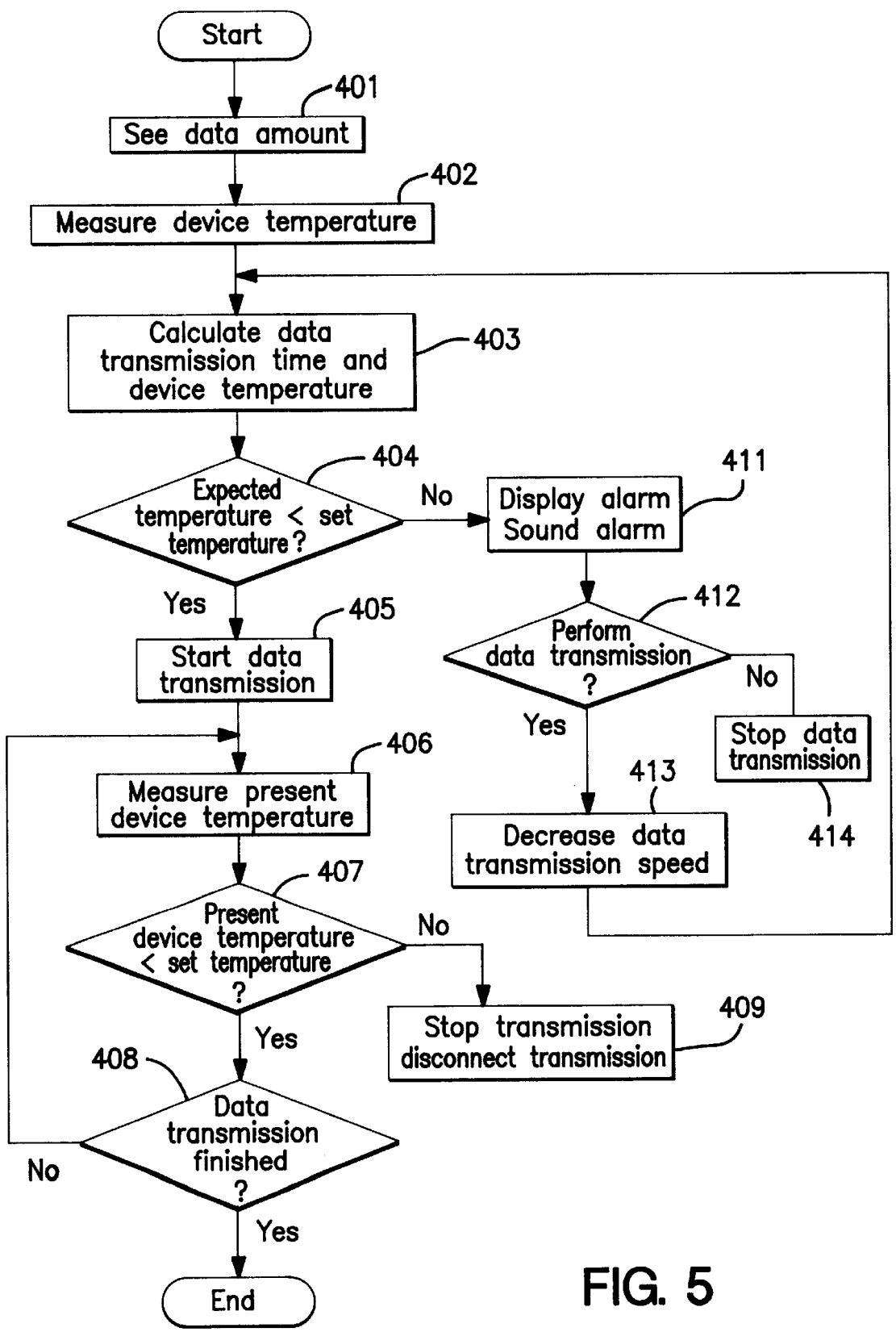
FIG. 5 is a flow chart for explaining the overheat preventing method for the portable telephone of the present invention.

Next, one embodiment of the overheat preventing method for a portable telephone of the present invention will be described with reference to FIG. 5.

First, information processing section 204 is applied with the data amount to be transmitted (step 401). Information processing section 204, in addition to measuring a temperature of the device at this moment (step 402), calculates the data transmission time based on the applied data amount and calculates the expected device temperature after transmission is finished based on the calculated data transmission time (step 403). The data transmission time in this case is one when data is transmitted in a way which causes the device to generate the largest amount of heat. The device temperature exhibits the largest rise when a power amplifier circuit always operates in continuous transmission at full power during a packet communication, for example.

Information processing section 204 compares the expected device temperature and the set temperature (step 404). At this time, when the expected device temperature is lower than the set temperature, data transmission is started (step 405). Thereafter, the device temperature is continuously measured during the data transmission (step 406), which means that the device temperature during the data transmission is always monitored by temperature sensor 205. If the device temperature goes higher than the set temperature (step 407), transmission is stopped or communication is disconnected (step 409).

When the expected device temperature resulting from the calculation is higher than the set temperature (step 404), the alarm is provided from speaker 207 and liquid crystal display section 206 as mentioned above (step 411) to make the data transmission on standby. Next, with the user making a selection, it is determined whether the data transmission is canceled or the data transmission speed is decreased to reduce heat generation and then the transmission is performed (step 412). When the data transmission speed is decreased (step 413), the procedure of calculating the data transmission time and the expected device temperature is repeated.

Incidentally, as an example of a user interface used at step 412 for determining by the user selection whether the data transmission is canceled or performed after decreasing the data transmission speed, a message "transmit? Y—1 N—0" is displayed in the liquid crystal display section and then the user presses dial "1" when performing the transmission and presses dial "0" when canceling the transmission (step 414), thereby making the selection.

It should be noted that the present invention has a function of stopping the data transmission automatically and remaining on standby until the device temperature is decreased, when the device temperature goes higher than the set temperature during the data transmission, for example. Also, a forced disconnection can be performed depending on a state of a battery remaining or the like.

While a preferred embodiment of the present invention has been described using specific terms, such description is for illustrative purposes only, and it is to be understood that changes and variations may be made without departing from the spirit or scope of the following claims.

What is claimed is:

1. An overheat preventing apparatus for a portable telephone controlled by a microcomputer, comprising:

transmission data input means for receiving transmission data;

information processing means for performing processing of calculation and comparison for a temperature based on an amount of the received data and information on a temperature;

temperature detection means for detecting a temperature of a device; and alarm means for generating an alarm when an expected temperature of the device is higher than a set temperature.

2. The overheat preventing apparatus for a portable telephone according to claim 1, wherein said information processing means receives the transmission data amount, calculates transmission time based on the data amount, and calculates the expected temperature when transmission is finished.

3. The overheat preventing apparatus for a portable telephone according to claim 1, wherein said information processing means compares the calculation result of the expected device temperature when transmission is finished and the set temperature of the device.

4. An overheat preventing method for a portable telephone controlled by a microcomputer, comprising the steps of:

receiving a transmission data amount, measuring a temperature of a device at this moment, and then calculating data transmission time and an expected temperature of the device when transmission is finished after a lapse of the data transmission time;

starting data transmission if the expected device temperature resulting from the calculation is lower than a set temperature;

measuring the device temperature during the data transmission and continuing the transmission when the temperature is lower than the set temperature and stopping the transmission if the temperature goes higher than the set temperature;

generating an alarm and making the transmission on standby when the expected device temperature resulting from the calculation is higher than the set temperature;

selecting whether data transmission is performed or not; and decreasing a data transmission speed and returning to said calculating step when it is selected that the data transmission is performed.

5. The overheat preventing method for a portable telephone according to claim 4, wherein the set temperature is a sufficiently low temperature not to damage the device.

6. The overheat preventing method for a portable telephone according to claim 4, wherein said alarm generating step is performed in either one or both of a method in which an alarm sound is generated from a speaker and a method in which a message is displayed in a liquid crystal display section.

7. The overheat preventing method for a portable telephone according to claim 4, wherein said recalculating step repeats the same procedure to that of said calculating step to see whether or not the expected device temperature when a user selects transmission at a decreased speed exceeds the set temperature.

* * * * *